Figures 1, 2:
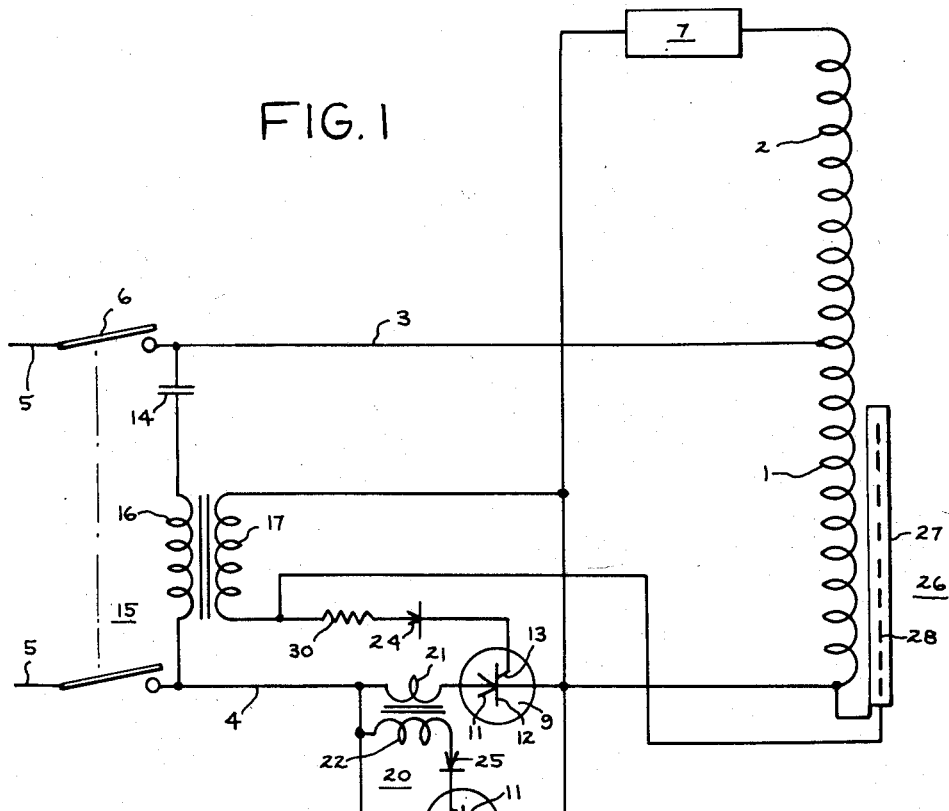

Jan. 1, 1963

J. F. GORDON 3,071,718

MOTOR PROTECTION CIRCUIT

Filed April 28, 1961

INVENTOR.
JAMES F. GORDON

BY *Walter E. Rule*

HIS ATTORNEY

United States Patent Office 3,071,718
Patented Jan. 1, 1963

3,017,718
MOTOR PROTECTION CIRCUIT
James F. Gordon, Anchorage, Ky., assignor to General
Electric Company, a corporation of New York
Filed Apr. 28, 1961, Ser. No. 106,350
6 Claims. (Cl. 318—473)

The present invention relates to motor circuits and is more particularly concerned with a new and improved circuit for thermally protecting an alternating current motor.

When an electric motor fails to start when energized or for any reason stops or continues to operate at a speed substantially below its normal operating speed when energized, the high current flowing through the motor windings under these abnormal conditions causes a substantial increase in the winding temperature. It then becomes necessary to cut off the power to the motor in order to prevent damage to the motor windings and insulation. Various switch means and circuits have been used or proposed for protecting a motor under such conditions. All of those presently used involved some switch means which for example, are centrifugally operated by means of the motor rotor or thermally operated by temperature sensing means so that as a result of a decrease in the rotor speed or an increase in the motor temperature, the switch contacts open and interrupt the power supply to the motor. Such switch means involve mechanical moving contacts which are subject to fatigue life limitations, sticking contacts, contact bounce and other problems associated with moving contacts.

The present invention has as its primary object the provision of an improved motor protection circuit which is designed to remove the motor from the line when the stator windings for any reason reach a predetermined abnormal temperature, and to connect the motor to the line when the stator windings cool below the overheated or abnormal temperature condition without the use of any mechanical switch means.

Another object of the invention is to provide a motor protection circuit which senses winding temperatures directly and is of the type which can be reliably used and is compatible with motors employed for example in pneumatically sealed refrigerating system.

A further object of the invention is to provide a motor protection circuit of the aforesaid type which also includes temperature responsive means for controlling the operation of the motor.

Further objects and advantages of the invention will become apparent as the following description proceeds and the features of novelty which characterize the invention will be pointed out with particularity in the claims annexed to and forming a part of this specification.

In accordance with the present invention there is provided a motor protection circuit which includes a pair of parallel connected and reversely positioned silicon controlled rectifiers arranged to form an alternating current switch for controlling the power supply to the motor windings. Each of the silicon controlled rectifiers comprises a cathode, an anode and a gating electrode and are of the type wherein conduction through the rectifier is initiated by the application of a gating signal to the gate electrode or element. For normally supplying to the gating elements a gating control signal sufficient to fire the rectifiers and thereby connect the motor to the source of power, there is provided a signal supply means comprising a transformer having its primary connected across the supply lines ahead of the rectifiers and its secondary functioning as a source for the gating signal. Under normal starting and operating conditions, the circut is designed to supply the required gating signal so that the respective rectifiers will function to supply an alternating current power supply to the motor winding. In order to interrupt the signal supplied to the rectifier gating elements and thereby interrupt the power supply to the motor whenever the motor winding temperatures exceed a predetermined maximum, means are provided for shorting the transformer secondary winding comprising a temperature sensor in heat exchange relationship with the motor windings. This sensor is of the type which has a high resistance and hence very little shunting action under normal motor temperature conditions but which exhibits a substantial decrease in resistance under abnormal temperature conditions to effectively shunt the transformer secondary and thereby interrupt the gating control signal to the rectifiers.

For a better understanding of the invention reference may be had to the accompanying drawing in which:

FIGURE 1 is a wiring diagram of a protective circuit for a single phase motor embodying the present invention; and FIGURE 2 is a wiring diagram of a modification of a portion of the circuit of FIGURE 1.

The silicon controlled rectifiers employed in the practice of the present invention are solid state transistor like devices each having anode and cathode electrodes and a gating electrode or element. These rectifiers block the flow of alternating current in both directions until a small but significant signal is applied to the gating element whereupon current is conducted in one direction. In other words, the gating element controls conduction through the rectifier in that it initiates conduction. In direct current applications, the gating element thereafter loses control over electric conduction from the anode to the cathode of the rectifier and conduction will continue as long as power is supplied to the rectifier through the anode and cathode electrodes. However, in alternating current applications, the current through the silicon controlled rectifier is turned off or commutated by the reversal of the line voltage during each cycle and since the turn off time for silicon controlled rectifiers is in the order of 25 microseconds or less, the silicon controlled rectifiers will turn off during each cycle of ordinary power supply frequencies and remain non-conducting unless a gating signal is continuously or again supplied to the gating element. For a more detailed description of silicon controlled rectifiers, reference is made to the publication "Controlled Rectifier Manual," first edition, published by the General Electric Company, Semiconductor Products Department, Auburn, New York (copyright 1960).

Referring to the drawing there is shown an embodiment of the present invention as applied to the protection of a single phase electric motor comprising a run winding 1 and a start winding 2 which are arranged to be connected in parallel through leads 3 and 4 to a source of alternating current power 5. A switch 6 in one or both of the lead lines 3 and 4 is provided for turning the motor on and off.

A start winding switch 7 may be arranged in series with the start winding 2 for the purpose of de-energizing the start winding when the motor has approached its operating speed. This start switch and its control means may be any of those normally employed for this purpose and may for example comprise a current operated relay energized by a special auxiliary winding (not shown) wound around a start pole of the stator in such a manner that the voltage generated in the auxiliary winding when the motor approaches operating speed will operate the relay to open the starting switch. Alternatively the start winding may be removed from the motor circuit by the starting circuit control means described and claimed in the copending application Serial Number 106,349 filed concurrently herewith in the name of James F. Gordon and assigned to the same assignee as the present invention. This circuit comprises a pair of silicon controlled rectifiers thereby eliminating any mechanical switches and contacts.

In accordance with the present invention, the motor is connected to the power source 5 by means of a pair of silicon controlled rectifiers 9 and 10 connected in one of the lines 3 or 4 in series with the motor windings 1 and 2. A signal supply circuitry is provided to supply the required firing or triggering signals to the rectifiers 9 and 10 during normal operation of the motor but to decrease the strength of the signals so supplied to the rectifiers to a value below that normally required for firing the rectifiers under abnormal temperature conditions within the motor. Each of the silicon controlled rectifiers 9 and 10 has an anode 11, a cathode 12 and a gating element 13 and are connected into one of the supply lines in parallel with one another but in reversed position relative to one another so that when fired or triggered by the application of gating signals to the two gating electrodes 13, one of the rectifiers will conduct half waves in one direction and the other will conduct half waves in the other direction thereby supplying an alternating current to the motor windings. In other words the two rectifiers 9 and 10 form an alternating current switch to control the flow of power to the motor windings.

For the purpose of supplying the required gating signals to the rectifiers 9 and 10 in order to energize the motor windings when the switch 6 is closed and the motor is operating under normal temperature conditions, there is provided a signal supply circuitry comprising a capacitor 14 and a transformer 15 including a primary winding 16 and a secondary winding 17. The capacitor 14 and the primary winding 16 are connected across the supply lines 3 and 4 ahead of the rectifiers 9 and 10 or in other words in parallel with the rectifiers and the motor windings and the secondary winding 17 of the transformer 15 is employed to supply the required gating signal to the rectifiers.

The circuitry including the secondary winding 17 of the transformer 15 for supplying the gating signals to the rectifiers 9 and 10 is of the master and slave type in that the firing of one of the rectifiers, specifically rectifier 9, generates the signal required to fire the other rectifier 10.

The master signal circuitry for rectifier 9 comprises the secondary winding 17, the gating electrode 13 and cathode electrode 12 of the rectifier 9 in closed series connection so that the rectifier 9 is caused to fire by a pulse from the transformer 15 connected across the supply lines 3 and 4. The capacitor 14 is included in the circuit including the primary winding 16 of the transformer 15 in order to obtain a phase shift in this circuit such that the pulse supplied to the rectifier 9 by the secondary winding 17 will cause the rectifier 9 to conduct through the full 180 degree or half wave of the cycle. The slave circuitry comprises a second transformer 20 having a primary winding 21 connected in series with the rectifier 9 and in parallel with the rectifier 10 and a secondary winding 22 which is connected in closed series relationship with the gating element 13 and cathode 12 of the rectifier 10. The transformer 20 is a current transformer so that the maximum secondary voltage occurs when the primary current goes though zero and the resultant pulse is used to fire the rectifier 10 thus allowing full wave conduction by the combined action of the two rectifiers.

By this arrangement it will be seen that the rectifier 9 is fired and there is therefore conducting during one half wave or cycle while the other rectifier 10 is conducting during the other half wave or cycle. Diode rectifiers 24 and 25 are respectively provided in the gating circuits for the rectifiers 9 and 10 in order to prevent the gating voltages to the respective rectifiers from becoming substantially negative with respect to the cathode or in other words to completely rectify the current supplied through the gating element and thereby eliminate any negative signal.

With the circuitry this far described, full half cycle conduction by each of the rectifiers 9 and 10 is assured so that there is supplied to the windings an alternating current having a wave shape such that the motor will start and continue to operate under normal operating conditions both as to speed and temperature. The phase shift accomplished by including the capacitor 14 in series with the transformer 15 provides the proper phase shift to obtain a full 180 degree conduction of the rectifier 9 while the transformer 20 having its primary 21 in series connection with the rectifier 9 provides a signal which assures full wave conduction of the rectifier 10.

In order to decrease the signal supplied to the rectifier 9 to a value which will turn off both the rectifier 9 and the rectifier 10 under any abnormal temperature conditions existing within the motor, means are provided for shunting or short circuiting the secondary winding 17 of transformer 15 whenever an abnormal temperature condition arises within the motor. To this end there is preferably employed a temperature sensor 26 in the form of a relatively long tubular member which is wrapped around the end turns of the motor run winding in good heat exchange relationship therewith. Preferably this temperature sensor 26 comprises an Inconel tube 27 and a nickel wire 28 centrally positioned within the tube 27 and separated therefrom by a thermally sensitive eutectic salt mixture. Such temperature sensors which are available on the market are provided with salt mixtures which have a high resistance in the solid state but are adapted to melt and therefore become conducting at a predetermined temperature. A salt mixture is selected which will become conducting at a temperature somewhat below any abnormal temperature which would adversely affect or damage the motor windings or insulation. With the sensor 26 wrapped around the end turns of the motor windings, in good heat exchange relationship with the windings but electrically insulated therefrom, any hot spot in the windings will cause the salt mixture adjacent that hot spot to melt and become conducting. As the sensor 26 is connected in parallel with, or in other words across, the secondary winding 17 of the transformer 15, any hot spot in the motor windings which results in the melting of the salt mixture at any point along the length of the sensor 26 lowers the resistance of the sensor to a point where it conducts and thereby shunts the output of the secondary winding 17.

FIGURE 2 illustrates a modification of the motor protection circuit of FIGURE 1 whereby the normal operation of the motor is controlled by a variable temperature condition or more specifically whereby the motor can be employed to drive, for example, suitable refrigeration apparatus for maintaining a given temperature within a refrigerated space. This modified circuitry is particularly adapted for use in controlling hermetically sealed motors such as those employed in the household refrigeration and air conditioning equipment.

The circuitry of FIGURE 2 differs from that of FIGURE 1 only in that there is included in that portion of the circuit including the transformer 15 and the capacitor 14, a thermistor 30 arranged to sense the controlling temperature. For example this thermistor element 30 may be positioned in contact with the evaporator of a refrigerating system or in heat exchange relationship with the air being conditioned by that system. Any of the well known thermistor elements having the proper temperature control range can be employed.

The element should have a relatively high resistance at "motor-off" temperatures. As the temperature sensed by the element 30 increases, its resistance drops thus allowing the transformer 15 to be energized and provide the gating signal necessary to fire the rectifiers 9 and 10 and operate the motor. Thus it will be seen that by employing an element 30 whose resistance changes with temperature, this element can be employed in place of the usual cold control switch preferably employed in refrigerating and air conditioning systems. In the operation of the motor under control of the circuit illustrated in FIGURE 2, whenever the resistance value of the thermistor 30 drops below that value required to energize the transformer 15 sufficiently to provide the required gating signal for the rectifiers, the motor will operate. On the other hand when the temperature sensed by the thermistor 30 decreases so that its resistance increases, the motor will be de-energized. During the time that the motor is energized, the temperature sensor 26 in heat exchange with the motor windings can override the energizing signal at any time that the windings become too hot thus turning off the motor or preventing the motor from turning on.

Since the sensors described hereinbefore and various other temperature responsive resistance elements do not become a direct short but instead have a low but finite value of resistance even when hot, it may be desirable to include in the signal circuit between the sensor connections thereto and the rectifier 9, a resistance 30 which functions to provide a voltage divider circuit such that the resistance of the sensor when hot is substantially less than the combined resistance of the resistance 30, diode 24 and the gate 13. The sensor 26 will then effectively shunt the signal away from the gate element 13 of rectifier 9 when the sensor is rendered conducting by the heat of the motor.

While various temperature sensors can be employed in the shunting circuit, those including a eutectic salt charge are preferred because of the very rapid change in resistance exhibited with a change in temperature at or near the melting point of the charge. This characteristic of a rapid change in resistance with change in temperature provides the desired shunting function without the use of auxiliary bridge circuits or the like for detecting or amplifying the resistance change. The ideal temperature-resistance characteristic for the sensor would be one with zero resistance at the critical or abnormal temperature and a very high resistance immediately below the temperature. However, since the resistance vs. temperature curves for available sensors are not ideal at normal motor operating temperatures, it is important that the capacitor 14 be employed to shift the phase of the gate signal so that the rectifiers will fire as soon as the positive anode-to-cathode voltage appears. Otherwise, there will result a condition in which, when the sensor cools just below its critical temperature, partial wave conduction of the rectifiers would not be sufficient to start the motor and only cause the sensor to again become heated and interrupt the motor circuit.

While the invention is described with reference to particular embodiments thereof, it will be understood that various other modifications may be made by those skilled in the art without actually departing from the invention and is therefore intended by the appended claims to cover all such variations as come within the true spirit and scope of the invention.

What I claim as new and desire to secure by Letters Patent of the United States is:

1. A motor protection circuit for interrupting the supply of power to a motor upon an abnormal increase in the temperature thereof, said circuit comprising a pair of supply lines for connecting said motor to a power source, a pair of silicon controlled rectifiers each having a control gate element, said rectifiers being connected in parallel and reversed relationship with one another in one of said supply lines, signal supply means for normally supplying to said gate elements a gating control signal sufficient to fire said rectifiers when said power lines are connected to a power source, and means responsive to an abnormal increase in the temperature of said motor for shorting said signal supply means to decrease said control signal to a value below that required to fire said rectifiers.

2. A motor protection circuit for interrupting the supply of power to a motor upon an abnormal increase in the temperature thereof, said circuit comprising a pair of supply lines for connecting said motor to a power source, a pair of silicon controlled rectifiers each having a control gate element, said rectifiers being connected in parallel and reversed relationship with one another in one of said supply lines, signal supply means for normally supplying to said gate elements a gating control signal sufficient to fire said rectifiers when said power lines are connected to a power source, a temperature-responsive resistance element in shunting connection with said signal supply means and in heat exchange with said motor for decreasing said control signal to a value below that required to fire said rectifiers upon an abnormal increase in the motor temperature.

3. In combination with a single phase motor having a motor winding, means including a pair of lines for connecting said motor winding to a power source, a pair of silicon controlled rectifiers each having an anode, a cathode and a gate electrode, a transformer including a primary winding and a secondary winding, means connecting said primary winding and one of said rectifiers in series between one of said lines and said windings and the other of said rectifiers in parallel with said primary winding and said one rectifier and in reversed relationship with said one rectifier, a slave firing circuit for firing said other rectifier when said one rectifier is fired comprising a circuit connecting said secondary winding in closed series connection with the gate electrode and cathode electrode of said other rectifier, signal supply means for normally supplying a gating signal to said one rectifier comprising a second transformer including a primary and a secondary winding, a capacitor, said capacitor and the primary winding of said second transformer being series connected across said lines in parallel with said rectifiers and motor winding, said secondary winding of said second transformer being connected in closed series connection with the gate electrode and cathode electrode of said one rectifier to form a circuit adapted to provide a signal to said one rectifier which will cause each of said rectifiers to conduct for substantially a full half cycle under normal motor temperature conditions, and means for reducing the signal to said one rectifier below that required to fire said rectifiers upon an abnormal increase in the temperature of said motor comprising a temperature sensor connected in parallel with said secondary winding of said second transformer and responsive to the temperature of said motor run winding, said sensor being adapted to decrease its resistance upon an abnormal increase in the temperature of said run winding to shunt said second transformer secondary winding and decrease the gating signal to said one rectifier below that required to fire said rectifiers.

4. In combination with a single phase motor having a run winding and a start winding in parallel connection, means including a pair of lines for connecting said windings to a power source, a pair of silicon controlled rectifiers each having an anode, a cathode and a gate electrode, a transformer including a primary winding and a second winding, means connecting said primary winding and one of said rectifiers in series between on of said lines and said windings, the other of said rectifiers being connecting in parallel with said primary winding and said one rectifier and in reversed relationship with said one rectifier, a slave firing circuit for firing said other rectifier when said one rectifier is fired comprising a circuit connecting said secondary winding in closed series connection with the gate electrode and cathode electrode of said other rectifier, signal supply means for normally supplying a gating signal to said one rectifier comprising a second transformer including a primary and a secondary winding, a capacitor, said capacitor and the primary winding of said second transformer being series connected across said lines in parallel with said rectifiers and motor windings, said secondary winding of said second transformer being connected in closed series connection with the gate electrode and cathode electrode of said one rectifier to form a circuit adapted to provide a signal to said one rectifier which will cause each of said rectifiers to conduct for substantially a full half cycle under normal motor temperature conditions, and means for reducing the signal to said one rectifier below that required to fire said rectifiers upon an abnormal increase in the temperature of said motor comprising a temperature sensor connected in parallel with said secondary winding of said second transformer and responsive to the temperature of said motor run winding, said sensor including a salt mixture adapted to decrease its resistance upon an abnormal increase in the temperature of said run winding and thereby shunt said second transformer secondary winding to decrease the gating signal to said one rectifier below that required to fire said rectifiers.

5. A motor circuit for controlling a motor and for interrupting the supply of power to a motor upon an abnormal increase in the temperature thereof, said circuit comprising a pair of supply lines for connecting said motor to a power source, a pair of silicon controlled-rectifiers each having a control gate element, said rectifiers being connected in parallel and reversed relationship with one another in one of said supply lines, a transformer including primary and secondary windings, signal supply means for normally supplying to said gate elements a gating control signal sufficient to fire said rectifiers when said power lines are connected to a power source comprising the primary winding of a transformer, a capacitor and a thermistor connected in series across said power lines and the secondary winding of the transformer connected to said rectifiers, said thermistor being adapted to control the energization of said primary winding in response to a temperature condition to be controlled, and means responsive to an abnormal increase in the temperature of said motor for shorting said signal supply means to decrease said control signal to a value below that required to fire said rectifiers.

6. In combination with a single phase motor having a run winding and a start winding in parallel connection, means including a pair of lines for connecting said windings to a power source, a pair of silicon controlled rectifiers each having an anode, a cathode and a gate electrode, a transformer including a primary winding and a secondary winding, means connecting said primary winding and one of said rectifiers in series between one of said lines and said windings, the other of said rectifiers being connecting in parallel with said primary winding and said one rectifier and in reversed relationship with said one rectifier, a slave firing circuit for firing said other rectifier when said one rectifier is fired comprising a circuit connecting said secondary winding in closed series connection with the gate electrode and cathode electrode of said other rectifier, signal supply means for normally supplying a gating signal to said one rectifier comprising a second transformer including a primary and a secondary winding, a capacitor, a temperature responsive resistance element, said capacitor, resistance element, and the primary winding of said second transformer being series connected across said lines in parallel with said rectifiers and motor windings, said secondary winding of said second transformer being connected in closed series connection with the gate electrode and cathode electrode of said one rectifier to form a circuit adapted to provide a signal to said one rectifier which will cause each of said rectifiers to conduct for substantially a full half cycle under normal motor temperature conditions, when said resistance element permits energization of said second transformer primary winding, and means for reducing the signal to said one rectifier below that required to fire said rectifiers upon an abnormal increase in the temperature of said motor comprising a temperature sensor connected in parallel with said secondary winding of said second transformer and responsive to the temperature of said motor run winding, said sensor including a salt mixture adapted to decrease its resistance upon an abnormal increase in the temperature of said run winding and thereby shunt said second transformer secondary winding to decrease the gating signal to said one rectifier below that required to fire said rectifiers.

No references cited.